United States Patent [19]

Prasad

[11] Patent Number: 5,308,382
[45] Date of Patent: May 3, 1994

[54] CONTAINER INERTING

[75] Inventor: Ravi Prasad, East Amherst, N.Y.

[73] Assignee: Praxair Technology, Inc., Danbury, Conn.

[21] Appl. No.: 48,622

[22] Filed: Apr. 16, 1993

[51] Int. Cl.⁵ .................. B01D 53/22; B01D 53/04
[52] U.S. Cl. ........................ 95/12; 95/52; 95/54; 95/95; 95/114; 62/9; 426/418
[58] Field of Search .................. 95/45, 54, 12, 52, 95, 95/114, 117, 126, 138; 426/418, 419; 62/9, 19, 23

[56] References Cited

U.S. PATENT DOCUMENTS

| | | | |
|---|---|---|---|
| 4,421,529 | 12/1983 | Revak et al. | 95/54 |
| 4,642,996 | 2/1987 | Harris et al. | 426/419 X |
| 4,681,602 | 7/1987 | Glenn et al. | 95/54 X |
| 4,806,132 | 2/1989 | Campbell | 95/54 X |
| 4,845,958 | 7/1989 | Senda et al. | 426/418 X |
| 4,881,953 | 11/1989 | Prasad et al. | 95/54 X |
| 5,035,726 | 7/1991 | Chen et al. | 95/54 |
| 5,102,432 | 4/1992 | Prasad | 55/16 |
| 5,120,329 | 6/1992 | Sauer et al. | 95/54 X |
| 5,156,009 | 10/1992 | Woodruff | 95/54 X |
| 5,160,768 | 11/1992 | Antoon, Jr. | 426/419 X |
| 5,165,246 | 11/1992 | Cipolla et al. | 62/471 |
| 5,169,412 | 12/1992 | Prasad et al. | 95/54 X |
| 5,172,558 | 12/1992 | Wassibauer et al. | 426/418 X |
| 5,185,014 | 2/1993 | Prasad | 95/54 |
| 5,207,806 | 5/1993 | Lagree et al. | 95/54 X |
| 5,226,931 | 7/1993 | Combier | 95/45 |

FOREIGN PATENT DOCUMENTS

| | | | |
|---|---|---|---|
| 0292834 | 11/1988 | European Pat. Off. | 426/418 |
| 0294036 | 12/1988 | European Pat. Off. | 95/54 |
| 0499495 | 1/1992 | European Pat. Off. | A23L 3/34 |
| 1590579 | 5/1970 | France | 426/419 |
| 63-296819 | 12/1988 | Japan | 95/45 |
| 1-023846 | 1/1989 | Japan | 426/418 |
| 1-174365 | 7/1989 | Japan | 426/418 |
| 1-174366 | 7/1989 | Japan | 426/418 |
| 2-307812 | 12/1990 | Japan | 95/54 |
| 1558446 | 4/1990 | U.S.S.R. | 95/45 |

OTHER PUBLICATIONS

Technology, vol. 132, No. 179, "Food Container that Stop the Rot at Sea", p. 24, 1991.
"Evolution of Membrane in Commercial air Separation", by Ravi Prasad et al., AICHE Spring National Meeting, Mar. 28, 1993.
Cargoware International, "A Change of Air", pp. 31–37, Mar. 1992.
"Container News,: European Focus: A Fresh Approach to Shipping Perishables", Tony Carding, pp. 28–30, Feb. 1992.
"High Purity Nitrogen Via Membrane Air Separation", by Ravi Prasad et al., AICHE National Spring Meeting Mar. 18, 1990.
"Operating Experience Using Membrane to Produce Nitrogen", by Dave R. Thompson et al., AICHE National Spring Meeting, Mar. 18, 1990.
"Advanced Membrane Process for High Purity Nitrogen", by Ravi Prasad, AICHE Meeting, Nov. 1992.

*Primary Examiner*—Robert H. Spitzer
*Attorney, Agent, or Firm*—Chung K. Pak

[57] ABSTRACT

A process for inerting an interior of a container, the process comprising:
(a) introducing an inert fluid rich stream into the interior of the container, the concentration of inert fluid in the inert fluid rich stream inert fluid being greater than the inert fluid concentration in the interior of the container;
(b) increasing the concentration of inert fluid in the inert fluid rich stream during its introduction into the interior of the container; and
(c) withdrawing or purging a waste gas stream containing at least one impurity and inert fluid from the interior of the container.

13 Claims, 3 Drawing Sheets

CONTAINER INERTING

FIELD OF THE INVENTION

The invention relates, in general, to a process for inerting at least one interior of a container and, in particular, to a process for increasing the rate of inerting the interior of a container, especially when at least one membrane is used as an inert fluid source.

BACKGROUND OF THE INVENTION

Inert fluids, particularly inert gases, are useful for controlling the atmosphere of the interior of a container or a vessel. Of these inert fluids, nitrogen gas is commonly utilized for inerting, for example, the interior of a container which is useful for transporting perishable goods or manufacturing semiconductor chips. To supply nitrogen or other inert gases to the interior of a container, various inert gas sources have been utilized. Some of these inert gas sources include cylinders, liquid tanks, membrane gas separation plants and pressure-swing or temperature-swing adsorption plants. The selection of a particular inert gas source for a particular inerting process, however, is dependent on the rate of inerting the interior of a container and the energy (power) consumption associated with the inerting inasmuch as they play important roles in commercial operations. Thus, there is a need to increase the rate of inerting the interior of a container while reducing the power cost associated with the inerting process, regardless what inert gas sources are employed.

SUMMARY OF THE INVENTION

According to the present invention, the above need is achieved by a phased concentration purge process for inerting an interior of a container. The process comprises:

(a) steadily introducing an inert fluid rich stream into said interior of said container, the concentration of inert fluid in said inert fluid rich stream being greater than the inert fluid concentration in said interior of said container;

(b) increasing the concentration of inert fluid in said inert fluid rich stream during its introduction into said container; and (c) withdrawing or purging a waste gas stream containing at least one impurity and inert gas from said interior of said container.

It is desirable to introduce initially the inert fluid rich stream into the interior of a container at the highest flow rate or substantially the highest flow rate which can be generated by any compression or pumping means associated with any inert fluid source for introducing the inert fluid rich stream into the interior of the container, e.g., at least one compressor or pumping means associated with at least one membrane gas separation system which is useful for producing a nitrogen rich stream. The concentration of inert fluid in the inert fluid rich stream can be intermittently, incrementally, continuously or progressively increased. Preferably, the concentration of inert fluid in the inert fluid rich stream is raised to greater than 93% or greater than 99% by volume, when at least one impurity, such as oxygen, in the interior of the container is reduced to about 1% to 10% by volume based on the total gas volume in the interior of the container. As the concentration of inert fluid in the inert fluid rich stream is increased, the flow rate of the inert fluid rich stream may be decreased. The waste gas stream vented from the interior of the container may optionally be recycled to a fluid separation system which is being used as a source for the inert fluid rich stream. When the fluid separation system or the inert fluid source is at least one membrane module comprising a membrane having non-permeate and permeate sides, at least a portion of the waste may be fed to the non-permeate side of the membrane in the module to increase the concentration of inert fluid in the inert fluid rich gas and/or may be fed to the permeate side of the membrane in the module to purge any moisture and/or oxygen therein, thus enhancing the production of the inert fluid rich stream.

As used herein the term "inert fluid" means any fluid that does not deleteriously react chemically with materials within the interior of a container at the atmospheric temperature condition, e.g., nitrogen and/or argon.

As used herein the term "an inert fluid rich stream" means a stream containing inert fluid in a concentration level greater than the concentration of inert fluid in the interior of a container.

As used herein the term "inerting" means a process for increasing the concentration of inert fluid in the interior of a container.

As used herein the term "at least one impurity" means any fluid or substance that reacts chemically with materials within the interior of the container at the atmospheric condition, e.g., oxygen or carbon monoxide.

As used herein the term "container" or "the interior of a container" means an enclosed space useful for storing, processing or manufacturing materials, such as perishable goods or semiconductor chips, under inert conditions.

DETAILED DESCRIPTION OF THE INVENTION

The present invention involves, among other things, a discovery that, by varying the concentration of inert fluid in an inert fluid rich stream during its introduction into the interior of a container (a phased concentration purging), the rate of inerting of the interior of the container can be significantly increased while reducing the power consumption associated with the inerting process. The rate of inerting and the power cost associated with the inerting process can be further improved by varying the flow rate of the inert fluid rich stream during its introduction into the interior of a container as the concentration of inert fluid in the inert fluid rich stream is being varied. That is, the flow rate of the inert fluid rich stream should be decreased as the concentration of inert fluid in the stream is increased. To further improve the efficiency of the inerting process, the inert fluid rich stream is initially introduced into a container at the highest flow rate or substantially the highest flow rate that can be generated by any pumping or compression means associated with any conduits for introducing inert fluid into the interior of the container and/or any inert fluid sources which are in fluid communication with the interior of the container.

The preferred container inerting systems of the present invention are described with reference to FIGS. 1 and 2. However, as can be readily appreciated, the description of these preferred embodiments in no way precludes numerous variations of other container inerting systems which will become readily apparent to those skilled in the art.

Figure 1:
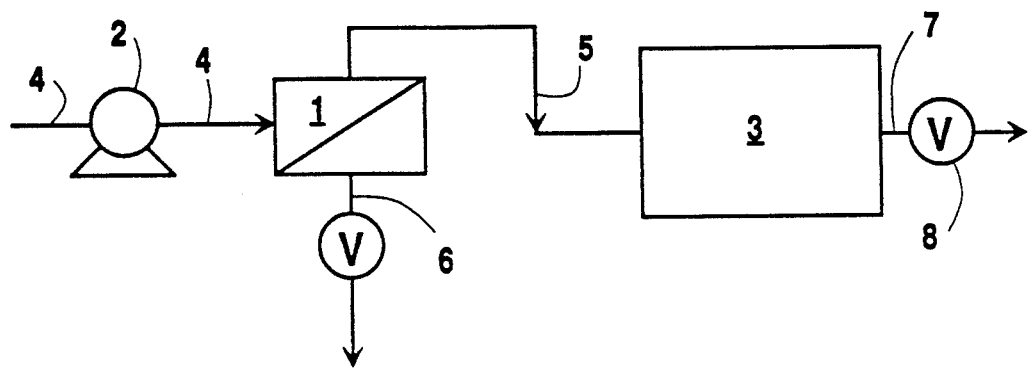
FIGS. 1 and 2 illustrate schematic flow diagrams of container inerting systems which are preferred embodiments of the present invention.
Figure 2:
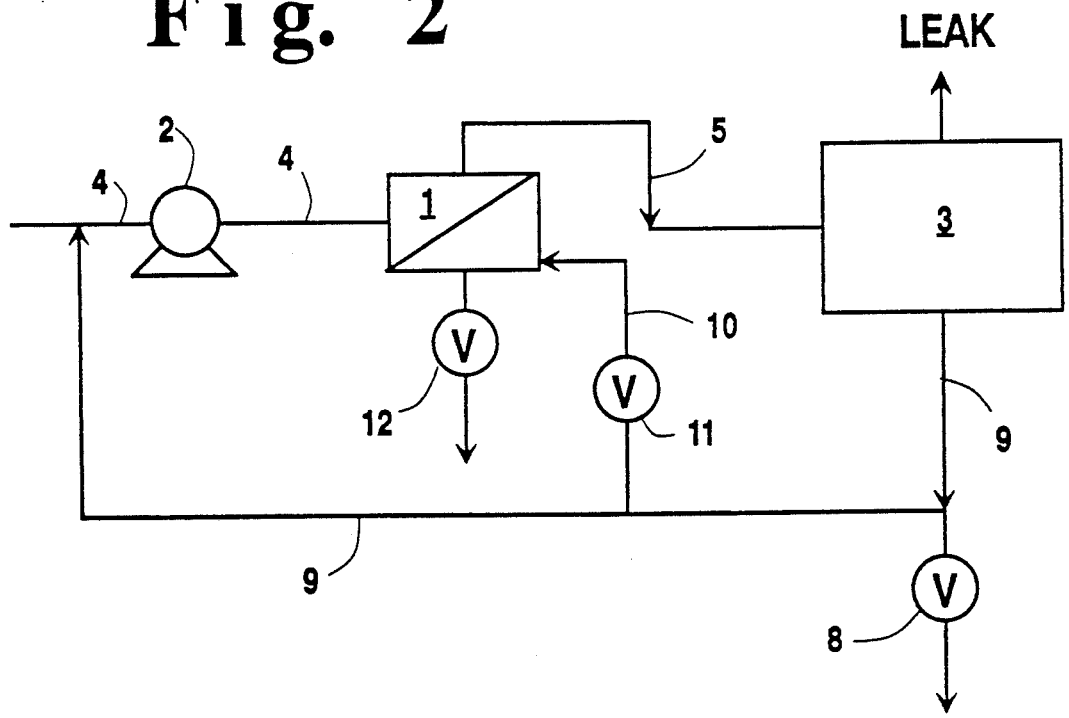

As shown by FIGS. 1 and 2, the preferred container inerting systems comprises, inter alia, an inert fluid source (1), a compression or pumping means (2) and a container (3). Initially, a feed fluid stream, such as air, is introduced into an inert fluid source (1) through at least one inlet line (4) via at least one compression or pumping means (2). The inert fluid source (1) employed may be selected from on-site inert fluid sources, such as membrane gas separation systems, cryogenic gas separation systems, pressure-swing or temperature-swing adsorption systems or combination thereof. Of these inert fluid sources, the membrane gas separation systems, such as those described in, e.g., U.S. Pat. No. 5,102,432, "Evolution of Membrane in Commercial Air Separation" by Ravi Prasad et al, AICHE Spring National Meeting, Mar. 28, 1993, "High Purity Nitrogen Via Membrane Air Separation" by Ravi Prasad et al, AICHE Spring National Meeting, Mar. 18, 1990, "Operating Experience Using Membranes to Produce Nitrogen" by Dave R. Thompson et al, AICHE Spring National Meeting, Mar. 18, 1990 and "Advanced Membrane Process for High Purity Nitrogen" by Ravi Prasad et al, AICHE National Meeting, Nov., 1992, which are herein incorporated by reference, are normally most preferred since they can be effectively and efficiently employed in small scale commercial operations. The concentration of inert gas in their output inert gas rich streams, however, is inversely related to the flow rates of their output inert gas rich stream.

Within the inert fluid source (1), the feed fluid stream, such as air, is separated to produce an inert fluid rich stream, e.g., a nitrogen rich stream, and a waste stream containing a significant amount of non-inert fluid, such as an oxygen rich stream. The inert fluid rich stream flows out of the inert fluid source (1) steadily through a line (5) to fill the interior of the container (3) after the start-up of the inert fluid source, i.e., after the start-up of the compression or pumping means (2). Meanwhile, the waste stream from the inert fluid source (1) is discarded through a line (6) having a valve (12).

During the introduction of the inert fluid rich stream into the container (3), the concentration of inert fluid in the steadily flowing inert fluid rich stream is increased either intermittently, incrementally, progressively or continuously in order to increase the rate of inerting the interior of the container (3) while reducing the power consumption associated with inerting the interior of the container (3). The concentration of inert fluid in the inert fluid rich stream, for example, at one point during the introduction into the interior of the container may be in the range of about 80% to 99.9% by volume, preferably about 80% to 97% by volume. When the oxygen concentration in the interior of the container is reduced to about 1% to about 10% by volume, preferably about 2% to about 6% by volume, based on the total gas volume in the interior of the container, the concentration of inert fluid in the inert fluid rich stream is increased to greater than about 93% by volume, preferably greater than 97% by volume, more preferably greater than 98% by volume. The initial concentration level of inert gas in the inert fluid rich stream is generally dependent on the type of inert fluid sources and/or inert fluid employed, but the final concentration of inert fluid in the inert fluid rich stream may be dependent on the utility of the container involved, e.g., storing or transporting perishable goods placed within the inert interior of the container (3) or manufacturing semiconductor chips within the inert interior of the container (3). When, for instance, nitrogen rich gas is used for inerting the interior of the container (3), the initial concentration of nitrogen in the nitrogen rich stream is in the range of about 80% to 99.9% by volume, preferably about 80% to about 97% by volume, while the final concentration of nitrogen in the nitrogen rich stream is greater than about 93% by volume, preferably greater than about 99% by volume, e.g., 99.9999% by volume for semiconductor manufacturing operations.

To further enhance the rate of inerting and energy consumption involved, the inert fluid rich stream is initially introduced into the interior of the container (3) at the highest flow rate or substantially the highest flow rate, which can be generated by at least one compression or pumping means associated with or in communication with at least one inert fluid source (1) or the container (3), e.g., the compression or pumping means (2). Generally, the initial flow rate of the inert fluid rich stream with respect to the container volume expressed in terms of space velocity per hour is in the range of about 0.02 to about 50, preferably 0.2 to 10.

The flow rate of the inert fluid rich stream may be then incrementally, intermittently, continuously or progressively decreased as the concentration of inert fluid in the inert fluid rich stream is either incrementally, intermittently, continuously or progressively increased. It is, however, understood that the flow rate of the inert fluid rich stream need not correspond exactly to the increased concentration of inert fluid in the inert fluid rich stream. In other words, the flow rate, for example, can be intermittently or incrementally decreased even though the inert fluid concentration is continuously increased. As long as the flow rate of the inert fluid rich stream is reduced in relation to the concentration of inert fluid in the inert fluid rich stream, the rate of inerting, as well as the energy consumption involved, is further improved. Generally, the final flow rate of the inert fluid rich stream with respect to the container volume expressed in terms of space velocity per hour is in the range of about 0.2 to about 200, preferably about 1 to about 50.

As the inert fluid rich stream enters the interior of the container (3), the resulting waste stream containing impurities and inert fluid within the interior of the container (3) is continuously removed or purged through a line (7) having a valve (8) until the desired inert fluid concentration, i.e., the desired inert environment, is attained within the interior of the container(3). Although the desired inert fluid concentration in the interior of the container (3) may vary with materials to be treated, such as perishable goods or semiconductor chips in the interior of the container (3), it should be such that less than about 7% oxygen by volume, preferably less than about 3% oxygen by volume, most preferably less than or equal to about 2% oxygen by volume based on the total gas volume (void volume) within the interior of the container (3) is maintained in order to inhibit deterioration of materials that need to be placed within the container (3).

The removed waste stream from the container (3) may be discarded through a line (7) or recycled via a line (9). It may be combined with a feed fluid stream for the inert fluid source to continuously or intermittently increase the concentration of inert fluid in the inert fluid rich stream which is being fed to the interior of the container (3). When at least one membrane module is used as the inert gas source, the concentration of inert gas in the inert gas rich stream can be continuously increased without varying the compressor flow rate. For instance, as the container atmosphere becomes richer in inert gas, the concentration of inert gas in the waste gas stream is increased. By combining the inert gas rich waste gas stream with a feed gas, such as air, the feed gas is enriched with inert gas. The concentration of inert gas in the inert gas rich stream from the non-permeated side of the membrane module is increased upon delivering the inert gas rich feed gas to the non-permeate side of the membrane in the module. Of course, if at least a portion of the waste gas stream in the line (9) is delivered to the permeate side of the membrane in the module through a line (10) having a valve (11) to purge oxygen and/or any moisture therein, the quality of the inert gas rich stream, which is fed into the interior of the container (3), can be further improved.

The following examples serve to illustrate the present invention. They are presented for illustrative purposes and are not intended to be limiting.

EXAMPLE 1

An inerting or purging process was carried out in the container inerting system of FIG. 1. The inert fluid source (1) employed was either a single membrane module or dual membrane modules. The container (3) has an interior volume (the total interior space) of about 2280 ft$^3$ but a void volume (the empty space or gas space within the interior space) of about 1480 ft$^3$. The concentration of oxygen, an impurity, in the void volume was about 21% by volume based on the total gas volume therein. The container pressure was about 0.5 inch H$_2$O, with a leak rate between about 40 and about 100 ft$^3$/hour. Initially, air was fed to the membrane modules using the compression means (2) to produce a nitrogen rich stream. In order to produce a nitrogen rich gas stream containing about 99% nitrogen gas by volume, its flow rate was maintained at about 279 ft$^3$/hour for the single membrane module or at about 558 ft$^3$/hour for the dual membrane modules since the nitrogen gas concentration of the nitrogen rich stream was inversely related to the flow rate of the nitrogen rich stream. The produced nitrogen rich stream was continuously introduced into the interior of the container (3) until only about 2% oxygen by volume remained in the interior of the container (the fixed concentration purge). Meanwhile, the resulting waste stream containing oxygen and nitrogen gas was continuously withdrawn from the interior of the container (3). The above container inerting process was repeated under the same conditions except that the concentration of inert gas in the nitrogen rich gas was increased from about 97% nitrogen gas by volume to about 99% nitrogen gas by volume during its introduction into the interior of the container(the phased concentration purge). Initially, the nitrogen rich gas containing 97% nitrogen was fed at the corresponding flow rate of about 532 ft$^3$/hour for the single membrane module and about 1062 ft$^3$/hour for the dual membrane modules. Upon reducing the concentration of oxygen in the interior of the container (3) to about 5% by volume, the concentration of nitrogen in the nitrogen rich gas was increased to about 99% nitrogen. This stream was continuously fed into the interior of the container (3) at the corresponding flow rate of about 279 ft$^3$/hour for the single membrane module and about 558 ft$^3$/hour for the dual membrane modules until the oxygen content in the container was reduced to about 2%. During the introduction of the nitrogen rich stream into the container (3), the resulting waste stream in the interior of the container was withdrawn. The results of both the fixed concentration purge and phased concentration purge above were calculated and tabulated in Table I.

TABLE I

| Number of Membrane modules | The time required for the phased concentration purge | The time required for the fixed concentration purge | ΔT |
|---|---|---|---|
| 1 | 14 hours | 16 hours | 2 hours |
| 2 | 6.5 hours | 7.5 hours | 1 hour |

As shown by Table 1, the rate of inerting the interior of the container (3) can be improved by employing the phased concentration purge. The time period required for inerting the container can be decreased by about 12% if the concentration of nitrogen, an inert gas, in the nitrogen rich stream can be varied whether one or two membrane modules were utilized.

EXAMPLE 2

An inerting or purging process was carried out in the container inerting system of FIG. 2. The inert fluid source (1) employed was a membrane module which was capable of producing a nitrogen rich stream containing 97% nitrogen at a flow rate of 1466 ft$^3$/hour, a nitrogen rich stream containing 98% nitrogen at a flow rate of 1330 ft$^3$/hour and a nitrogen rich stream containing 99% nitrogen at a flow rate of 1161 ft$^3$/hour. The container (3) has an interior volume (the total interior space) of about 2280 ft$^3$ but a void volume (the empty space or gas space within the interior space) of about 1480 ft$^3$. The concentration of oxygen, an impurity, in the void volume was about 21% by volume based on the total gas volume therein. The container pressure was about 0.5 inch H$_2$O, with a leak rate between about 40 and about 100 ft$^3$/hour. Initially, air is delivered to the membrane module via the compression means (2) to produce a nitrogen rich stream. The produced nitrogen rich stream was fed to the interior of the container (3) while removing the resulting waste stream in the interior of the container (3). The concentration of nitrogen in the nitrogen rich stream is continuously increased without varying the compressor flow rate by combining the vented waste gas stream with air which is being delivered to the non-permeated side of the membrane module. As the container atmosphere becomes richer in nitrogen, the concentration of nitrogen in the waste gas stream and the nitrogen rich stream from the membrane module was correspondingly increased. Without altering the flow rate of the nitrogen rich stream, the concentration of nitrogen in the nitrogen rich stream can be adjusted or increased by combining air feed with a particular amount of the waste gas stream. By adjusting the above inerting process, a nitrogen rich gas stream containing about 98% nitrogen gas by volume was initially fed at about 1330 ft$^3$/hour to the interior of the container. During the introduction of the nitrogen rich stream, the resulting waste stream containing oxygen and nitrogen gas was continuously withdrawn from the interior of the container (3) until only about 2% oxygen by volume remained in the interior of the container. The above container inerting process was repeated under the same conditions except that the concentration of inert gas in the nitrogen rich gas was increased from about 97% nitrogen gas by volume to about 99% nitrogen gas by volume during its introduction into the interior of the container. Initially, the nitrogen rich gas containing 97% nitrogen was fed at a flow rate of about 1446 ft$^3$/hour. Upon reducing the concentration of oxygen in the interior of the container (3) to about 6% by volume, the concentration of nitrogen in the nitrogen rich gas was increased to about 99% nitrogen. This stream was continuously fed into the interior of the container (3) at a flow rate of about 1161 ft$^3$/hour until the content of oxygen in the container is reduced to about 2%. During the introduction of the nitrogen rich stream into the container (3), the resulting waste stream in the interior of the container was withdrawn. The results of both the fixed concentration purge and phased concentration purge above were calculated based on an assumption that the flow rate of the feed air and recycle gas was constant. The results are tabulated below in Table II.

TABLE II

|  | N$_2$ Concentration | The time required for inerting | Number of Membrane modules |
| --- | --- | --- | --- |
| Recycle purge (I) | Initial concentration 98% by volume | 14 | 1 |
| Recycle Purge (II) | Initial concentration 97% by volume followed by 99% by volume | 12.5 | 1 |

As shown by Table II, the rate of inerting the interior of the container (3) can be improved by recycling the waste stream from the container (3). If the concentration of nitrogen, an inert gas, in the nitrogen rich stream can be varied during the introduction of the nitrogen rich stream into the container, however, the time period required for inerting the container can be further decreased by about 10%.

Figure 3:
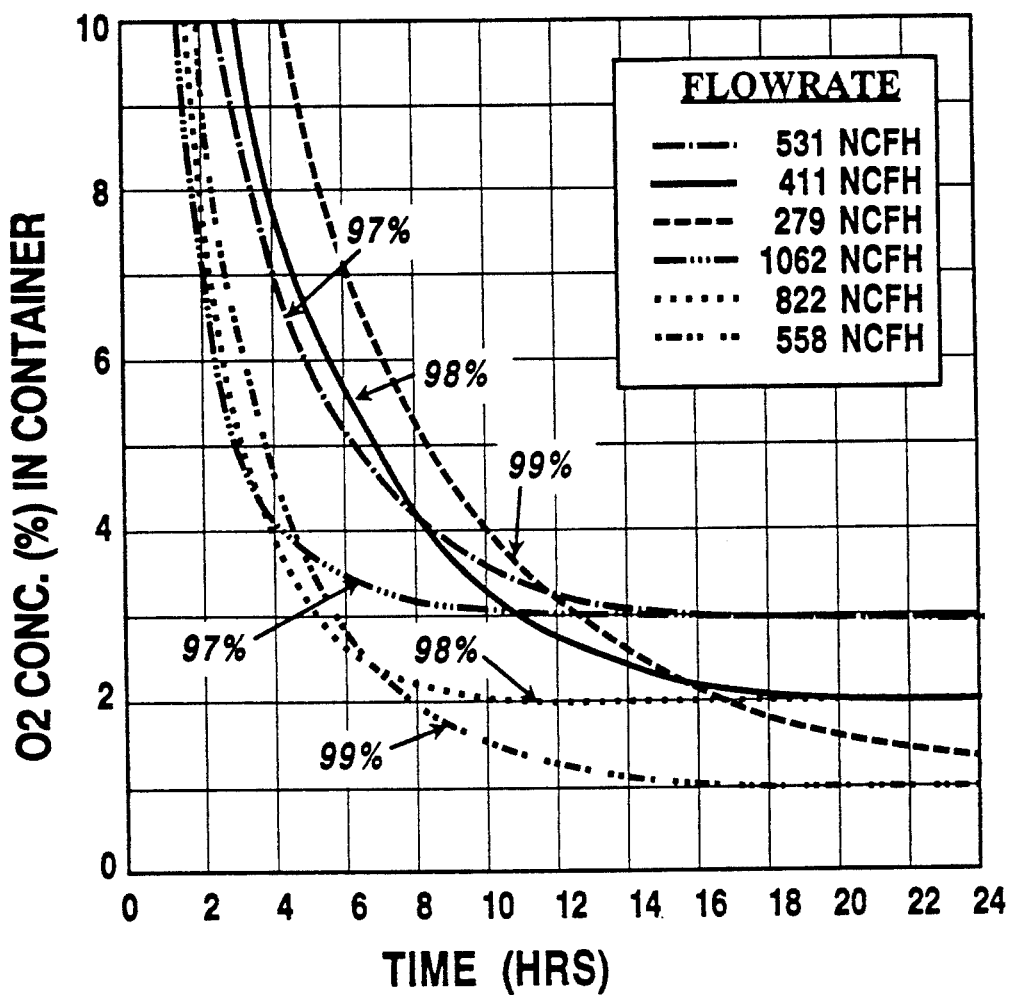
FIG. 3 shows a graph illustrating the oxygen concentration in the interior of the container versus time for the flows corresponding to the nitrogen concentration in nitrogen rich gases which are utilized in the container inerting system of FIG. 1.
Figure 4:
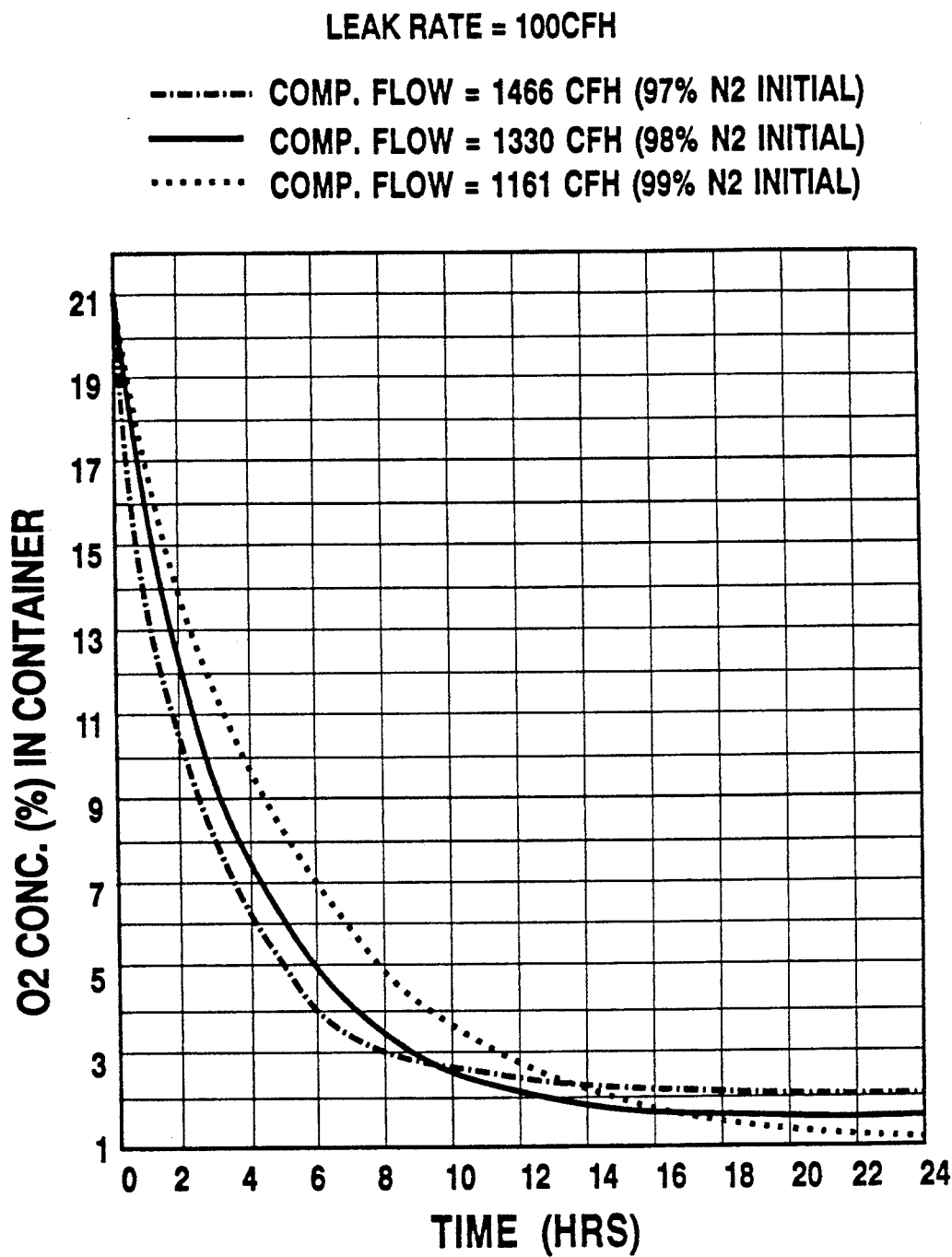
FIG. 4 shows a graph illustrating the oxygen concentration in the interior of the container versus time for the flows corresponding to the nitrogen concentration in the nitrogen rich gases which are utilized in the container inerting system of FIG. 2.

FIGS. 3 and 4 also show graphs illustrating the effect of introducing different nitrogen rich gases from different membrane modules having different surfaces into the interior of the container (3) at the flow rates which correspond to the concentration of nitrogen in the nitrogen rich gases. The graphs indicate that the employment of the nitrogen rich gas having a fixed concentration of nitrogen significantly delays the rate of inerting the interior of the container (3).

Although the process of this invention has been described in detail with reference to certain embodiments, those skilled in the art will recognize that there are other embodiments of the invention within the spirit and scope of the claims.

What is claimed is:

1. A process for inerting an interior of a container, said process comprising:
    (a) steadily introducing an inert fluid rich stream into said interior of said container, the concentration of inert fluid in said inert fluid rich stream being greater than the inert fluid concentration in said interior of said container;
    (b) increasing the concentration of inert fluid in said inert fluid rich stream during its introduction into said container; and
    (c) withdrawing or purging a waste gas stream containing at least one impurity and inert gas from said interior of said container.

2. The process for inerting an interior of a container according to claim 1, further comprising decreasing the flow rate of said inert fluid rich stream as the concentration of inert fluid in said inert fluid rich stream is increased during its introduction into said interior of said container.

3. The process for inerting an interior of a container according to claim 1, wherein said inert fluid rich stream is an inert gas rich stream selected from a nitrogen rich stream and an argon rich stream.

4. The process for inerting an interior of a container according to claim 3, wherein the concentration of inert gas in said inert gas rich stream is intermittently, incrementally, continuously or progressively increased.

5. The process for inerting an interior of a container according to claim 3, further comprising passing a gas mixture to at least one membrane having non-permeate and permeate sides to produce said inert gas rich stream from the non-permeate side of said at least one membrane while removing a second waste stream from the permeate side of said at least one membrane.

6. The process for inerting an interior of a container according to claim 5, further comprising passing at least a portion of the waste stream from said interior of the container to said non-permeate side of said at least one membrane with said gas mixture.

7. The process for inerting an interior of a container according to claim 5, further comprising passing at least a portion of the waste stream from said interior of the container to the permeate side of said at least one membrane to purge oxygen and/or moisture thereon.

8. The process for inerting an interior of a container according to claim 5, wherein said inert gas rich stream introduced into said interior of said container is flowing at the highest flow rate or substantially the highest flow rate which can be generated by any compression or pumping means associated with supplying said gas mixture to said at least one membrane.

9. The process for inerting an interior of a container according to claim 1, further comprising passing a gas mixture to at least one gas separation system selected from at least one membrane system, at least one pressure-swing adsorption system, at least one temperature-swing adsorption system and at least one cryogenic gas distillation system to produce said inert fluid rich stream.

10. A process for purging oxygen from an interior of a container, said process comprising steps of:
    (a) introducing an inert gas rich stream into said interior of said container, the concentration of inert gas in said inert gas rich stream being greater than 80% by volume but less than or equal to about 99.9% by volume;
    (b) increasing the concentration of inert gas in said inert gas rich stream to greater than about 93% by volume, upon reducing the concentration of oxygen in said interior of the container to about 1% to about 10% by volume based on the total gas volume in said interior of the container;

(c) feeding the resulting inert gas rich stream containing the increased concentration of inert gas into said interior of the container until the concentration of oxygen in the interior of the container is less than or equal to 7%; and (d) withdrawing or purging a waste gas stream containing oxygen and inert gas from said interior of said container during the introduction of said inert gas rich stream.

11. The process for purging oxygen from an interior of a container according to claim 10, further comprising separating air with at least one membrane module comprising a membrane having a permeate side and a non-permeate side to provide said inert gas rich stream of step (a).

12. The process for purging oxygen from an interior of a container according to claim 11, further comprising passing at least a portion of the waste stream to the non-permeate side of the membrane in said at least one membrane module to increase the concentration of inert gas in the nitrogen gas stream.

13. The process for purging oxygen from an interior of a container according to claim 11, further comprising passing at least a portion of the waste stream to the permeate side of the membrane in said at least one membrane module to purge any moisture and/or oxygen on said permeate side of the membrane.

* * * * *